(No Model.)
J. A. McKEE & P. G. HATCHETT.
AUTOMATIC BRAKE.
No. 486,886. Patented Nov. 29, 1892.
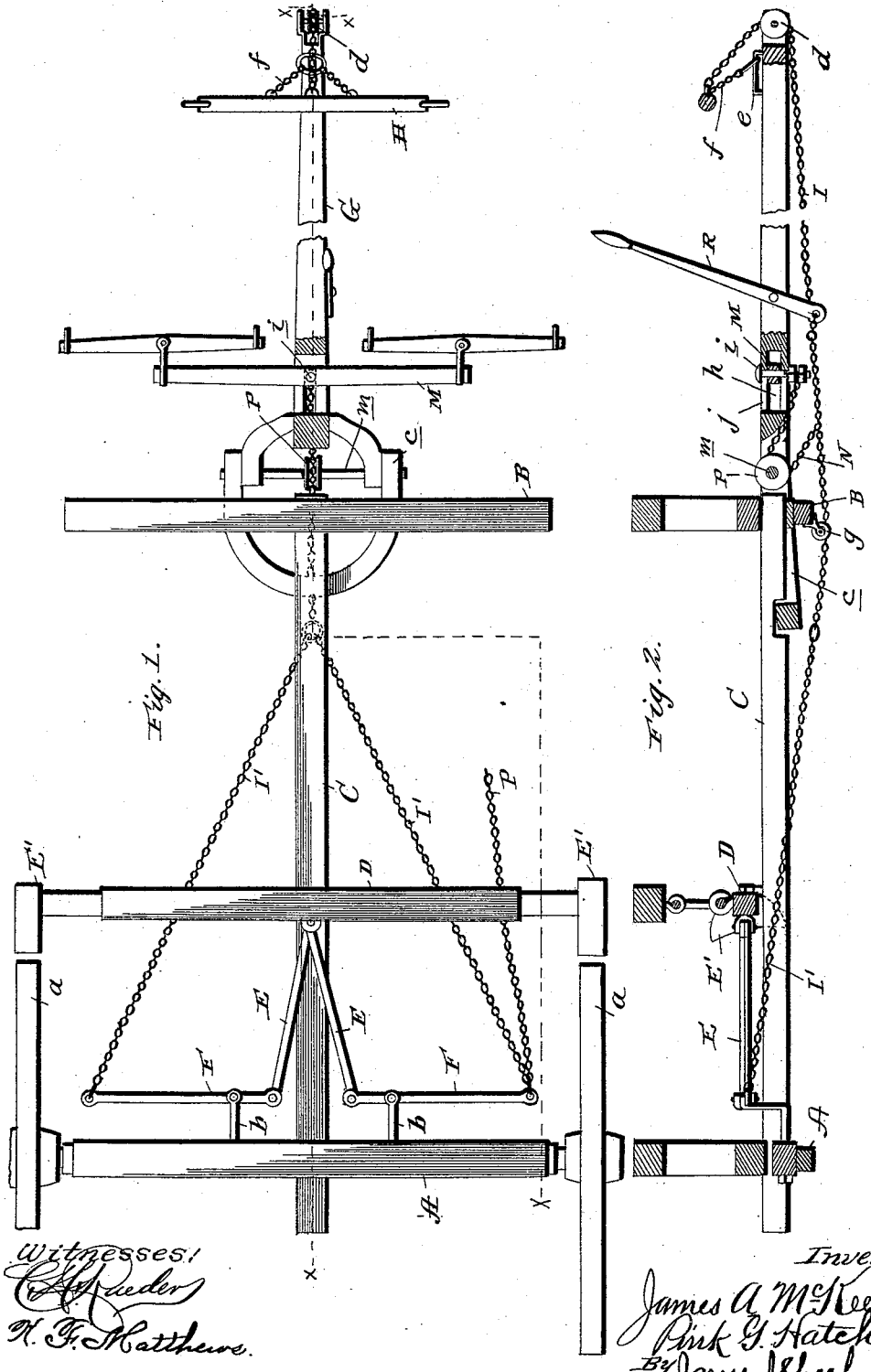

UNITED STATES PATENT OFFICE.

JAMES A. McKEE AND PINK G. HATCHETT, OF ALEXANDER, TEXAS.

AUTOMATIC BRAKE.

SPECIFICATION forming part of Letters Patent No. 486,886, dated November 29, 1892.

Application filed May 26, 1892. Serial No. 434,455. (No model.)

*To all whom it may concern:*

Be it known that we, JAMES A. McKEE and PINK G. HATCHETT, citizens of the United States, residing at Alexander, in the county of Erath and State of Texas, have invented certain new and useful Improvements in Automatic Brakes; and we do declare the following to be a full, clear, and exact description of the invention, such as will enable others skilled in the art to which it appertains to make and use the same.

Our invention has relation to improvements in automatic brakes; and it has for its general object to provide a brake of such construction that it will be automatically applied when the vehicle is traveling down a grade and will be automatically released and held out of engagement with the wheels when the vehicle is traveling upon a plain or up a grade.

To the attainment of the foregoing and other objects the invention consists of a movable brake-beam, a pair of levers connected therewith, a movable neck-yoke, a movable doubletree, and mechanism intermediate the neck-yoke and doubletree and the brake adapted to apply the brakes when the neck-yoke is pulled rearwardly or toward the vehicle and release the brakes when the doubletree is pulled forwardly or away from the vehicle.

In the accompanying drawings, Figure 1 is a top plan view of a vehicle running-gear with our improvements applied, and Fig. 2 is a vertical section taken in the plane indicated by the dotted line *x x* of Fig. 1.

Referring by letter to said drawings, A indicates the rear axle of a running-gear, B indicates the forward axle, and C indicates the coupling-pole, all of which may be of the ordinary or any approved construction.

Suitably mounted upon the coupling-pole in advance of the rear traveling wheels *a* is the transverse brake-beam D, which carries the brake-shoe E', designed and adapted to engage and brake the wheels *a*. This brake-beam D is connected by links, as E, with the inner ends of the levers F, which are fulcrumed at intermediate points in their lengths upon the bracket-arms *b*, extending forwardly from the axle A.

G indicates the tongue of the vehicle which is connected to the hounds *c*, as shown, and is provided at or adjacent to its forward end with a suitable bearing for the vertically-disposed friction-pulley *d*. This tongue G is also provided upon its upper side adjacent to its forward end with a longitudinally-extending keeper *e*, to which is loosely connected one end of the short chains *f*, which are connected at their opposite ends to the neck-yoke H, whereby it will be readily perceived that said yoke is free to move rearwardly or toward the vehicle when subjected to a backward draft.

Connected at one end to the neck-yoke at about the middle thereof and taking over the friction-pulley *d* is the rearwardly-extending chain I, which preferably takes over a friction-pulley *g* upon the front axle B and merges into the rearwardly-diverging chains I', which are connected to the outer or power ends of the levers F, by reason of which it will be seen that when the neck-yoke is pulled rearwardly by the draft-animals in going down a grade the brakes will be strongly and positively applied.

Formed in the tongue G, adjacent to the rear end thereof, is a longitudinal transversely-disposed slot *h* to receive the movable doubletree M, which is secured against lateral displacement by the bolt *i*, which takes through and is adapted to move in the longitudinal vertically-disposed slot *j*, as shown. This doubletree M is connected by a branch chain N with the chain I, and this branch chain N takes over a friction-pulley P, mounted upon a shaft *m*, carried by the hounds *c*, whereby it will be seen that when the doubletree is pulled forward, as in traveling upon a plain or up a grade, the brakes will be released and will be firmly held in such position. Fulcrumed at an intermediate point in its length to the tongue G is a hand-lever R, which is connected at its lower end to the chain I and is designed to serve as a medium through which the driver of the vehicle may readily control the brakes when desired.

In the practice of our invention we design running a chain, such as *p*, from the outer end of one of the levers F to a hand-lever fulcrumed upon the side of a wagon-box; but we do not desire to be confined to such chain, as its use is only preferable.

Although we have in some respects specifically described the construction and arrangement of the several elements of our brake, we do not desire to confine ourselves to the same, as such changes or modifications may be made as fairly fall within the scope of our invention.

Having described our invention, what we claim is—

1. In an automatic vehicle-brake, substantially as described, the combination, with a running-gear, the movable brake-beam carrying the wheel-engaging shoes, the levers F, fulcrumed in bearings on the rear axle of the running-gear, and the links connecting the levers and the brake-beam, of the lever R, the chain connected to one end of said lever and extending rearwardly therefrom, a suitable means for connecting said chain and the levers F, a movable tree, friction-pulley P, carried by the tongue, and a branch chain taking over said pulley P and connected at one end to the movable tree and at its opposite end to the rearwardly-extending chain, substantially as and for the purpose set forth.

2. In an automatic vehicle-brake, substantially as described, the combination, with a running-gear, the movable brake-beam, the levers F, fulcrumed in bearings carried by the rear axle, the links connecting the levers and the brake-beam, and the tongue carrying the friction-pulley $d$ at its forward end and also carrying the friction-pulley P adjacent to its rear end, of a movable neck-yoke, a chain connected at one end to the neck-yoke and taking over the friction-pulley $d$ of the tongue and extending rearwardly, the lever R, carried by the tongue and having one of its ends connected to the chain, a suitable means for connecting the said chain and the levers F, a movable doubletree, and a chain connected at one end to the doubletree and taking over the pulley P and connected at its opposite end to the rearwardly-extending chain, all substantially as and for the purpose stated.

In testimony whereof we affix our signatures in presence of two witnesses.

JAMES A. McKEE.
PINK G. HATCHETT.

Witnesses:
JOE LOGAN,
W. S. WATSON.